(12) United States Patent
Kunimochi

(10) Patent No.: US 10,310,171 B2
(45) Date of Patent: Jun. 4, 2019

(54) PLANAR ILLUMINATION APPARATUS

(71) Applicant: MINEBEA MITSUMI Inc., Nagano (JP)

(72) Inventor: Toru Kunimochi, Shizuoka (JP)

(73) Assignee: MINEBEA MITSUMI INC., Nagano (JP)

( * ) Notice: Subject to any disclaimer, the term of this patent is extended or adjusted under 35 U.S.C. 154(b) by 0 days.

(21) Appl. No.: 15/893,881

(22) Filed: Feb. 12, 2018

(65) Prior Publication Data

US 2018/0239082 A1   Aug. 23, 2018

(30) Foreign Application Priority Data

Feb. 22, 2017 (JP) ................... 2017-031549

(51) Int. Cl.
*F21V 8/00* (2006.01)
*G02F 1/1333* (2006.01)
*G02F 1/1335* (2006.01)

(52) U.S. Cl.
CPC ..... *G02B 6/0088* (2013.01); *G02F 1/133308* (2013.01); *G02F 1/133524* (2013.01);
(Continued)

(58) Field of Classification Search
CPC ............... G02B 6/0088; G02B 6/0086; G02F 2001/133314; G02F 2001/133317; G02F 2001/13332; G02F 2001/133356; G02F 2001/133562; G02F 1/133524; G02F 2001/13356; G02F 1/133308; G02F 1/133615

See application file for complete search history.

(56) References Cited

U.S. PATENT DOCUMENTS 6,552,761 B1 * 4/2003 Seo .................. G02F 1/133308
349/58
7,609,355 B2 * 10/2009 Nouchi ............. G02F 1/133608
349/113

(Continued)

FOREIGN PATENT DOCUMENTS

CN        2059598894 U    2/2017
JP        2008-258164 A   10/2008
(Continued)

OTHER PUBLICATIONS

Notification of Reasons for Refusal dated Feb. 26, 2019 for corresponding Japanese Application No. 2017-031549 and English translation.

*Primary Examiner* — Mariceli Santiago
(74) *Attorney, Agent, or Firm* — Pearne & Gordon LLP

(57) ABSTRACT

A planar illumination apparatus according to an embodiment includes: a frame including a bottom surface that is curved as viewed in a cross section, and a side wall that is provided in a standing manner so as to surround a circumference of the bottom surface; a light guide plate that is housed in the frame, that is curved along the bottom surface as viewed in the cross section, and that includes an emission surface for emitting light; and a plurality of optical sheets that are arranged along the emission surface of the light guide plate and that overlap with one another in a plan view. An end portion of at least one of the plurality of optical sheets is fixed to an upper end surface of the side wall of the frame via a fixing member.

16 Claims, 8 Drawing Sheets

(52) U.S. Cl.
CPC ............... *G02F 1/133615* (2013.01); *G02F 2001/13332* (2013.01); *G02F 2001/133314* (2013.01); *G02F 2001/133317* (2013.01); *G02F 2001/133562* (2013.01)

(56) References Cited

U.S. PATENT DOCUMENTS

| | | | |
|---|---|---|---|
| 9,113,553 B2* | 8/2015 | An | G02F 1/133308 |
| 9,338,905 B2* | 5/2016 | Ahn | G02F 1/133308 |
| 2007/0146569 A1* | 6/2007 | Nouchi | G02F 1/133611 |
| | | | 349/58 |
| 2010/0302717 A1* | 12/2010 | Oh | G02F 1/133308 |
| | | | 361/679.01 |
| 2015/0160406 A1* | 6/2015 | Zhou | G02F 1/133608 |
| | | | 349/65 |

FOREIGN PATENT DOCUMENTS

| | | |
|---|---|---|
| JP | 2010-140831 A | 6/2010 |
| JP | 2013-242525 A | 12/2013 |
| JP | 2014-095901 A | 5/2014 |

\* cited by examiner

PLANAR ILLUMINATION APPARATUS

CROSS-REFERENCE TO RELATED APPLICATION(S)

The present application claims priority to and incorporates by reference the entire contents of Japanese Patent Application No. 2017-031549 filed in Japan on Feb. 22, 2017.

BACKGROUND OF THE INVENTION

1. Field of the Invention

The present invention relates to a planar illumination apparatus.

2. Description of the Related Art

Conventionally, there is a known planar illumination apparatus including a frame that houses, in a curved manner, a light guide plate and an optical sheet arranged on the light guide plate. In the planar illumination apparatus mentioned above, a supporting portion and a concave portion are provided on the curved frame, a convex portion provided on the optical sheet is fitted to the concave portion provided on the frame, and an edge of the optical sheet is supported by the supporting portion to fix the optical sheet onto the frame.

However, in the planar illumination apparatus according to the conventional technology described above, it is necessary to provide the supporting portion and the concave portion in the curved frame to fix the optical sheet. Therefore, it is difficult to cope with a demand to reduce a frame size of the curved frame.

SUMMARY OF THE INVENTION

A planar illumination apparatus according to an embodiment of the present invention includes: a frame including a bottom surface that is curved as viewed in a cross section, and a side wall that is provided in a standing manner so as to surround a circumference of the bottom surface; a light guide plate that is housed in the frame, that is curved along the bottom surface as viewed in the cross section, and that includes a emission surface for emitting light; and a plurality of optical sheets that are arranged along the emission surface of the light guide plate and that overlap with one another in a plan view. An end portion of at least one of the plurality of optical sheets is fixed to an upper end surface of the side wall of the frame via a fixing member.

DETAILED DESCRIPTION OF THE PREFERRED EMBODIMENTS

Figure 1:
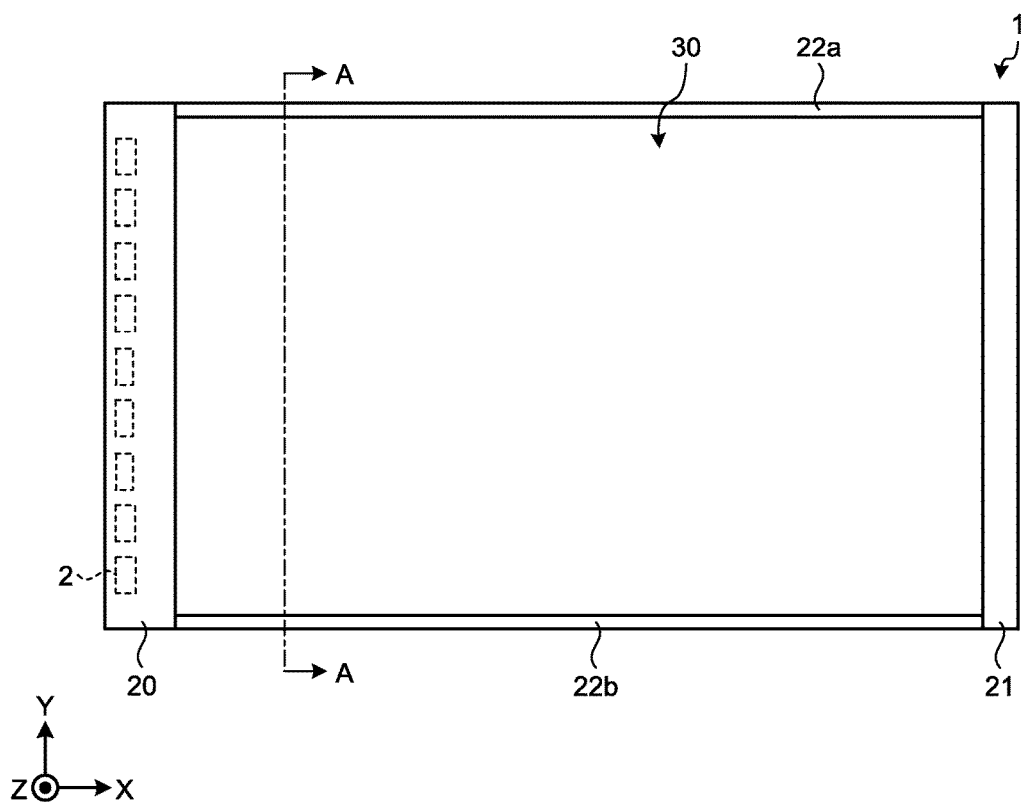
FIG. 1 is a plan view illustrating an example of an external appearance of a planar illumination apparatus according to an embodiment.

Hereinafter, embodiments of a planar illumination apparatus will be described with reference to the drawings. The present invention is not limited by the embodiments below. The relative size of a component, the ratio between components, and the like in the drawings may be different from those of actual components. In addition, the relative size and the ratio of some parts may be different between the drawings.

Figure 2:
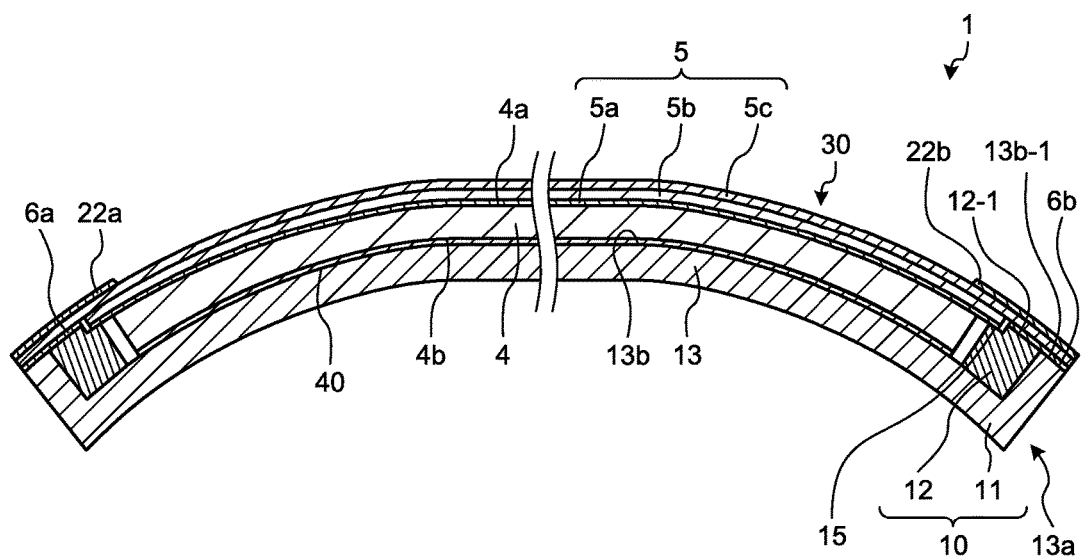
FIG. 2 is a schematic cross-sectional view taken along a line A-A in FIG. 1.

First, a configuration example of a planar illumination apparatus 1 according to an embodiment will be described with reference to FIG. 1 and FIG. 2. In the planar illumination apparatus 1 described below, a surface from which light is emitted is not a flat surface but a curved surface. FIG. 1 is a plan view illustrating an example of an external appearance of the planar illumination apparatus according to the embodiment. FIG. 2 is a schematic cross-sectional view taken along a line A-A in FIG. 1.

In FIG. 1 and FIG. 2, for simplicity of explanation, a three-dimensional rectangular coordinate system including the Z-axis with the positive direction toward a light emission side surface of the planar illumination apparatus 1, the X-axis corresponding to the long side direction of the planar illumination apparatus 1, and the Y-axis corresponding to the short side direction of the planar illumination apparatus 1 is illustrated. The rectangular coordinate system may be illustrated in other drawings referred to in the descriptions below.

As illustrated in FIG. 1, the planar illumination apparatus 1 according to the embodiment emits light of a light emitting diode (LED) 2 from an effective region 30, which is not covered by a first light shielding sheet 20, a second light shielding sheet 21, and third light shielding sheets 22a and 22b, on an emission surface 4a of a light guide plate 4 (see FIG. 2).

Specifically, in the planar illumination apparatus 1, the effective region 30 of the emission surface 4a of the light guide plate 4 (see FIG. 2) is defined by the first light shielding sheet 20, the second light shielding sheet 21, and the third light shielding sheets 22a and 22b. In this example, the first light shielding sheet 20, the second light shielding sheet 21, and the third light shielding sheets 22a and 22b are separately provided; however, they may be provided integrally to define the effective region 30.

The LED 2 is a point-like light source, and is, for example, a pseudo white LED constituted of a blue LED and a yellow phosphor. A plurality of the LEDs 2 are arranged at equal intervals along the short side direction (the Y-axis direction) of the planar illumination apparatus 1 (see FIG. 1). The plurality of LEDs 2 have light emitting surfaces on the side opposite to the light guide plate 4, and emit light from the light emitting surfaces toward the light incident side surface of the light guide plate 4. The light guide plate 4 guides the light that has entered the light incident side surface. It is preferable that the LED 2 is a side view type, in which a flexible printed circuit (FPC), which is arranged on a surface of a bottom portion 13 of a frame 10 (see FIG. 2) and on which the LEDs 2 are mounted, is oriented perpendicularly to the light emitting surfaces of the LEDs 2.

The planar illumination apparatus 1 is used as, for example, a backlight of a liquid crystal display. The liquid crystal display is used in, for example, an information mobile terminal, such as a smartphone or a tablet.

Furthermore, as illustrated in FIG. 1, the first light shielding sheet 20 covers a side on which the LEDs 2 are arranged, and the second light shielding sheet 21 covers a side opposite to the side on which the LEDs 2 are arranged. The first light shielding sheet 20 has a wider width in the long side direction (the X-axis direction) than the second light shielding sheet 21 in order to cover the LEDs 2. The third light shielding sheets 22a and 22b will be described in detail later.

As illustrated in FIG. 2, the planar illumination apparatus 1 includes the frame 10, the light guide plate 4, a reflection sheet 40, a lower diffusion sheet 5a, a prism sheet 5b, an upper diffusion sheet 5c, and the third light shielding sheets 22a and 22b.

The frame 10 is moderately curved in a convex shape toward the positive side in the Z-axis direction as viewed in the cross section taken along the line A-A. Specifically, as viewed in the cross section taken along the line A-A, a central portion of the frame 10 is flat and both ends of the frame 10 are moderately inclined in a direction away from the light guide plate 4. The frame 10 includes a case body 11 and a frame member 12.

The case body 11 is made of stainless steel plate that has large rigidity, for example. The case body 11 includes the bottom portion 13 and a side wall 13a.

The bottom portion 13 includes a bottom surface 13b, both ends of which are moderately inclined in a direction away from the light guide plate 4 as viewed in the cross section taken along the line A-A. The side wall 13a is provided in a standing manner so as to surround the circumference of the bottom surface 13b on a light emission direction side.

The frame member 12 is made of resin, for example. The frame member 12 is provided along an inner surface of the case body 11 except for an inner surface facing the LEDs 2. Furthermore, a notch portion 15 is provided in an upper part of the inner peripheral side of the frame member 12 on the light emission direction side. Therefore, an upper end surface 12-1 is provided on the frame member 12.

In this example, the frame 10 is constituted by the case body 11 and the frame member 12; however, the frame 10 may be constituted by only the case body 11. In this case, the case body 11 is formed in a shape integrated with the frame member 12 for example, and the notch portion 15 is provided in an upper part of the inner peripheral side of the side wall 13a on the light emission direction side.

The frame 10 as describe above houses the LEDs 2, the light guide plate 4, the reflection sheet 40, the lower diffusion sheet 5a, the prism sheet 5b, and the upper diffusion sheet 5c.

The light guide plate 4 is curved along the bottom surface 13b of the case body 11 as viewed in the cross section taken along the line A-A. The light guide plate 4 guides light coming from the LEDs 2 and causes the light to emit in a planar manner. The light guide plate 4 is made of, for example, a flexible material including a translucent material, such as polycarbonate resin or acrylic resin.

The light guide plate 4 described above includes a pair of principal surfaces 4a and 4b that face each other in a light emission direction, a light incident side surface (not illustrated) that faces the light emitting surfaces of the LEDs 2, and an opposite side surface (not illustrated) that is a side surface on the side opposite to the light incident side surface.

The one principal surface 4a, which is provided on the light emission direction side between the two principal surfaces 4a and 4b, serves as an emission surface (light emitting surface) from which light coming from the light incident side surface (light emitted by the LEDs 2) is emitted. The other principal surface 4b, which is provided on the side opposite to the light emission direction side, serves as a reflection surface from which light that has entered the light guide plate 4 is reflected.

That is, an optical path change pattern formed of a plurality of dots is provided on the other principal surface 4b, the optical path change pattern changes a traveling direction of light traveling inside the light guide plate 4, and the light is emitted from the one principal surface 4a, for example. In the descriptions below, the "one principal surface 4a" is described as the "emission surface 4a", and the "other principal surface 4b" is described as the "reflection surface 4b".

The reflection sheet 40 is arranged along the reflection surface 4b of the light guide plate 4, reflects light leaked from the reflection surface 4b of the light guide plate 4, and returns the light to the light guide plate 4. The reflection sheet 40 is fixed to the bottom surface 13b of the case body 11 with a double-sided tape (not illustrated).

A conventional planar illumination apparatus will be described below. In the conventional planar illumination apparatus, a supporting portion and a concave portion are provided on a curved frame, a convex portion provided on an optical sheet is fitted to the concave portion provided on the frame, and an edge of the optical sheet is supported by the supporting portion to fix the optical sheet to the frame.

However, in the conventional planar illumination apparatus, it is necessary to provide, on the curved frame, the supporting portion and the concave portion for fixing the optical sheet. Therefore, it is difficult to cope with a demand to reduce a frame size of the curved frame.

Therefore, the planar illumination apparatus according to the embodiment is configured such that a pair of end portions of at least one of optical sheets that overlap with one another as viewed in a plan view are fixed to an upper end surface of a side wall of the curved frame via fixing members.

With this configuration, the planar illumination apparatus according to the embodiment can reduce a frame size of the curved frame.

Figure 3:
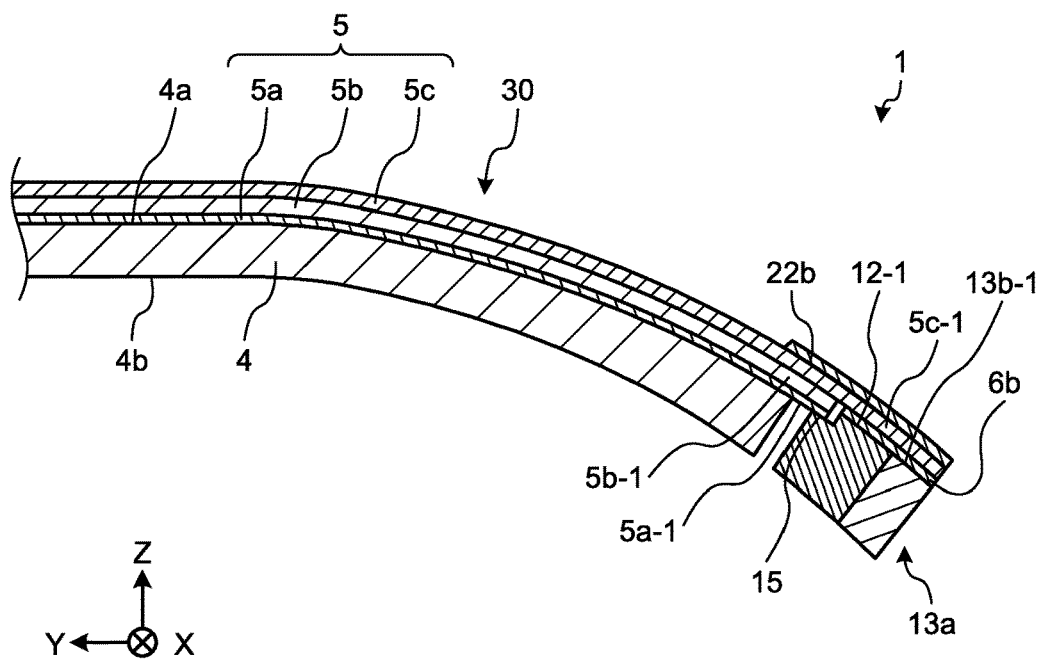
FIG. 3 is a schematic cross-sectional view of one side wall of a frame in FIG. 2.

With reference to FIG. 2 and FIG. 3, fixation of the plurality of optical sheets 5 to the curved frame 10 in the planar illumination apparatus 1 according to the embodiment will be described in detail below. FIG. 3 is a schematic cross-sectional view of the one side wall 13a of the frame 10 illustrated in FIG. 2. In FIG. 3, components other than components to be described below are not illustrated.

As illustrated in FIG. 2 and FIG. 3, the planar illumination apparatus 1 according to the embodiment includes the plurality of optical sheets 5, in particular, the three optical sheets 5a, 5b, and 5c in this example, on the emission surface 4a side of the light guide plate 4. In this example, the three optical sheets 5a, 5b, and 5c are the lower diffusion sheet 5a, the prism sheet 5b, and the upper diffusion sheet 5c.

The lower diffusion sheet 5a, the prism sheet 5b, and the upper diffusion sheet 5c are flat sheets, and arranged along the curved emission surface 4a of the light guide plate 4 so as to overlap with one another as viewed in a plan view. In this example, an end portion 5a-1 of the lower diffusion sheet 5a and an end portion 5b-1 of the prism sheet 5b are curved so as to conform to the light guide plate 4, and tips of the end portions 5a-1 and 5b-1 are arranged in the notch portion 15 of the frame member 12. Furthermore, an end portion 5c-1 of the upper diffusion sheet 5c is curved so as to conform to the light guide plate 4, and the end portion 5c-1 is fixed to the upper end surface 12-1 of the frame member 12 and an upper end surface 13b-1 of the side wall 13a.

While the end portions 5a-1, 5b-1, and 5c-1 on one side of the lower diffusion sheet 5a, the prism sheet 5b, and the upper diffusion sheet 5c are illustrated in FIG. 3, configurations of the both ends of the lower diffusion sheet 5a, the prism sheet 5b, and the upper diffusion sheet 5c are the same; therefore, the end portions 5a-1, 5b-1, and 5c-1 on one side will be described below.

The lower diffusion sheet 5a covers the curved emission surface 4a of the light guide plate 4. The end portion 5a-1 of the lower diffusion sheet 5a is arranged in the notch portion 15. The lower diffusion sheet 5a diffuses light emitted from the emission surface 4a of the light guide plate 4.

The prism sheet 5b covers a curved surface of the lower diffusion sheet 5a on the side opposite to the emission surface 4a. The end portion 5b-1 of the prism sheet 5b is arranged in the notch portion 15.

In this example, the prism sheet 5b is an optical sheet in which a lower prism sheet and an upper prism sheet are deposited in this order from the emission surface 4a side. The lower prism sheet collects light traveling in the X-axis direction to allow the light to travel in the Z-axis direction, for example. The upper prism sheet collects light traveling in the Y axis direction to allow the light to travel in the Z-axis direction, for example.

The upper diffusion sheet 5c covers a curved surface of the prism sheet 5b on the side opposite to the emission surface 4a. The end portion 5c-1 of the upper diffusion sheet 5c is fixed to the upper end surface 12-1 of the frame member 12 and the upper end surface 13b-1 of the side wall 13a via a fixing member 6b. The upper diffusion sheet 5c diffuses the light emitted and collected from the surface of the prism sheet 5b on the side opposite to the emission surface 4a.

Figure 4:
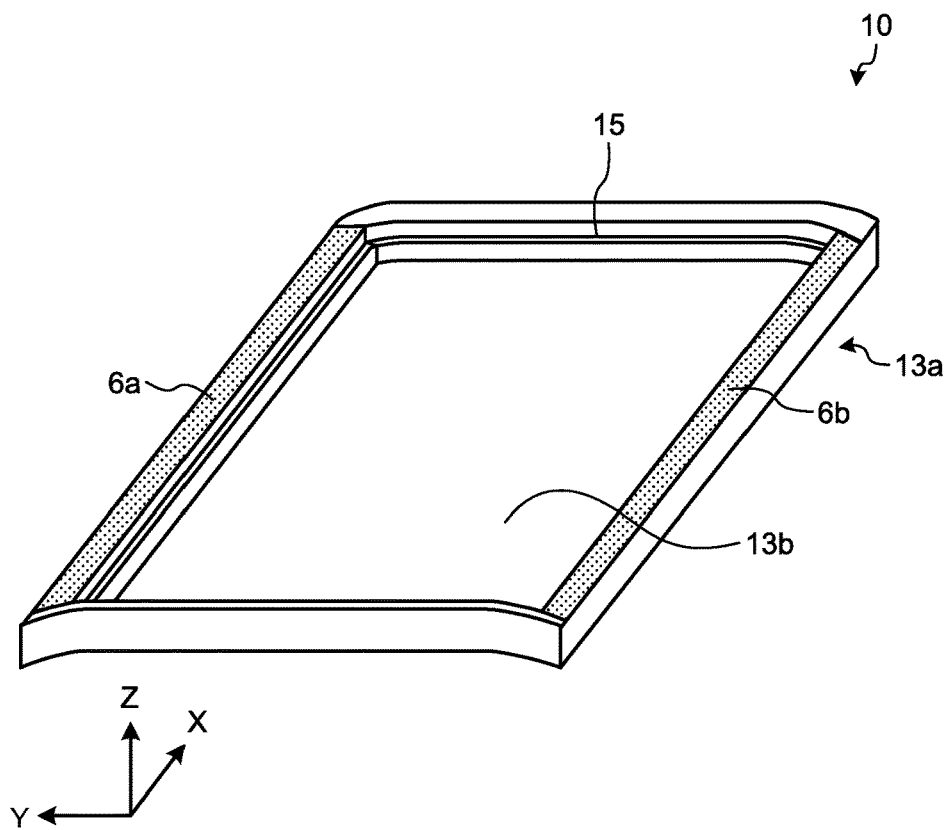
FIG. 4 is an explanatory diagram illustrating a mounting position of a fixing member in the frame.

Next, with reference to FIG. 4, mounting positions of a fixing member 6a and the fixing member 6b for fixing the upper diffusion sheet 5c to the upper end surface 12-1 of the frame member 12 and the upper end surface 13b-1 of the side wall 13a will be described in detail below. FIG. 4 is a diagram for explaining the mounting positions of the fixing members 6a and 6b in the frame 10.

As illustrated in FIG. 4, the fixing members 6a and 6b are arranged on the upper end surface 12-1 of the frame member 12 and the upper end surface 13b-1 of the side wall 13a covered by the third light shielding sheets 22a and 22b, respectively. Examples of the fixing members 6a and 6b include a double-sided tape and an adhesive agent.

The fixing member 6a fixes the one end portion 5c-1 of the upper diffusion sheet 5c to the upper end surface 12-1 of the frame member 12 and the upper end surface 13b-1 of the side wall 13a. Specifically, the fixing member 6a fixes a surface of the one end portion 5c-1 of the upper diffusion sheet 5c facing the emission surface 4a of the light guide plate 4 to the upper end surface 12-1 of the frame member 12 and the upper end surface 13b-1 of the side wall 13a.

The fixing member 6b fixes the other end portion 5c-1 of the upper diffusion sheet 5c to the upper end surface 12-1 of the frame member 12 and the upper end surface 13b-1 of the side wall 13a. Specifically, the fixing member 6b fixes a surface of the other end portion 5c-1 of the upper diffusion sheet 5c facing the emission surface 4a of the light guide plate 4 to the upper end surface 12-1 of the frame member 12 and the upper end surface 13b-1 of the side wall 13a.

The fixing members 6a and 6b fix the upper diffusion sheet 5c located farthest from the emission surface 4a to the frame 10, so that reaction forces of the lower diffusion sheet 5a and the prism sheet 5b to return to original shapes can be prevented by the upper diffusion sheet 5c.

Furthermore, in the planar illumination apparatus 1 according to the embodiment, the third light shielding sheets 22a and 22b are arranged so as to cover the end portions 5c-1 of the upper diffusion sheet 5c fixed to the frame 10 (see FIG. 2 and FIG. 3).

The third light shielding sheets 22a and 22b described above are, for example, double-sided tapes with adhesive faces on both sides, and fix the upper diffusion sheet 5c and the liquid crystal display.

The third light shielding sheets 22a and 22b can prevent light leaked from the notch portion 15 of the frame member 12 from being emitted from the emission surface 4a.

As described above, in the planar illumination apparatus 1 according to the embodiment, the end portions 5c-1 of the upper diffusion sheet 5c located farthest from the emission surface 4a are fixed to the upper end surface 12-1 of the frame member 12 and the upper end surface 13b-1 of the side wall 13a via the fixing members 6a and 6b, respectively.

Furthermore, the end portion 5a-1 of the lower diffusion sheet 5a and the end portion 5b-1 of the prism sheet 5b are arranged in the notch portion 15, which is provided in the upper part of the inner peripheral side of the frame member 12, in the manner of being pressed by the upper diffusion sheet 5c.

Therefore, in the planar illumination apparatus 1 according to the embodiment, fixation of the plurality of optical sheets 5 to the curved frame 10 can be realized by the fixing members 6a and 6b arranged on the upper end surface 12-1 of the frame member 12 and the upper end surface 13b-1 of the side wall 13a.

That is, in the planar illumination apparatus 1 according to the embodiment, the fixing members 6a and 6b are directly bonded to the upper end surface 12-1 of the frame member 12 and the upper end surface 13b-1 of the side wall 13a, so that the end portion 5c-1 of the upper diffusion sheet 5c located farthest from the emission surface 4a is firmly fixed.

By the fixation of the upper diffusion sheet 5c to the frame 10 as described above, the lower diffusion sheet 5a and the prism sheet 5b are pressed and fixed to the frame 10.

With this configuration, in the planar illumination apparatus 1 according to the embodiment, it is possible to firmly fix the plurality of optical sheets 5a, 5b, and 5c to the frame 10, and reduce a frame size of the curved frame 10.

Furthermore, in the planar illumination apparatus 1 according to the embodiment, the end portion 5a-1 of the lower diffusion sheet 5a, which is located on the side wall 13a covered by the third light shielding sheet 22b, and the end portion 5b-1 of the prism sheet 5b, which is located on the side wall 13a covered by the third light shielding sheet 22b, are arranged in the notch portion 15.

With this configuration, in the planar illumination apparatus 1 according to the embodiment, the surface of the prism sheet 5b is flush with the surfaces of the fixing members 6a and 6b. Therefore, it is possible to easily attach the upper diffusion sheet 5c to the fixing members 6a and 6b.

That is, in the planar illumination apparatus 1 according to the embodiment, it is possible to easily fix the plurality of optical sheets 5 to the curved frame 10. Consequently, it is possible to improve the productivity of the apparatus.

Furthermore, in the planar illumination apparatus 1 according to the embodiment, the curved frame 10 is constituted by the case body 11 and the frame member 12 or by only the case body 11. Therefore, it is possible to easily process the case body 11 and the frame member 12. Consequently, the curved frame 10 can be made thin.

In the embodiment described above, the third light shielding sheets 22a and 22b cover the end portions 5c-1 of the upper diffusion sheet 5c fixed to the frame 10. However, it may be possible to further cover an outer surface of the side wall 13a of the case body 11 by the third light shielding sheet 22a (22b).

Figure 5:
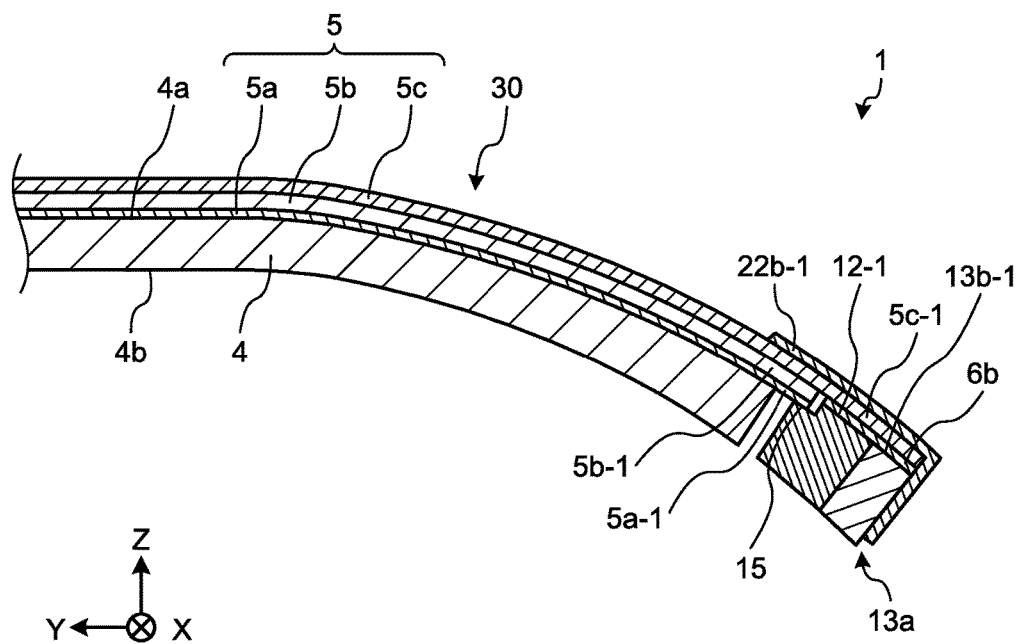
FIG. 5 is an explanatory diagram illustrating a third light shielding sheet according to a modification.

This embodiment will be described below with reference to FIG. 5. FIG. 5 is an explanatory diagram illustrating third light shielding sheets 22a-1 and 22b-1 according to a modification. Components with the same functions as the components illustrated in FIG. 3 are denoted by the same reference signs illustrated in FIG. 3, and explanation thereof will be omitted. FIG. 5 illustrates the third light shielding sheet 22b-1 of the two third light shielding sheets 22a-1 and 22b-1.

As illustrated in FIG. 5, the third light shielding sheet 22b-1 is arranged so as to cover the end portion 5c-1 of the upper diffusion sheet 5c fixed to the frame 10 and the outer surface of the side wall 13a.

With this configuration, the third light shielding sheet 22b-1 can reliably prevent light leaked from the notch portion 15 of the frame member 12 from being emitted from the emission surface 4a.

Figure 6:
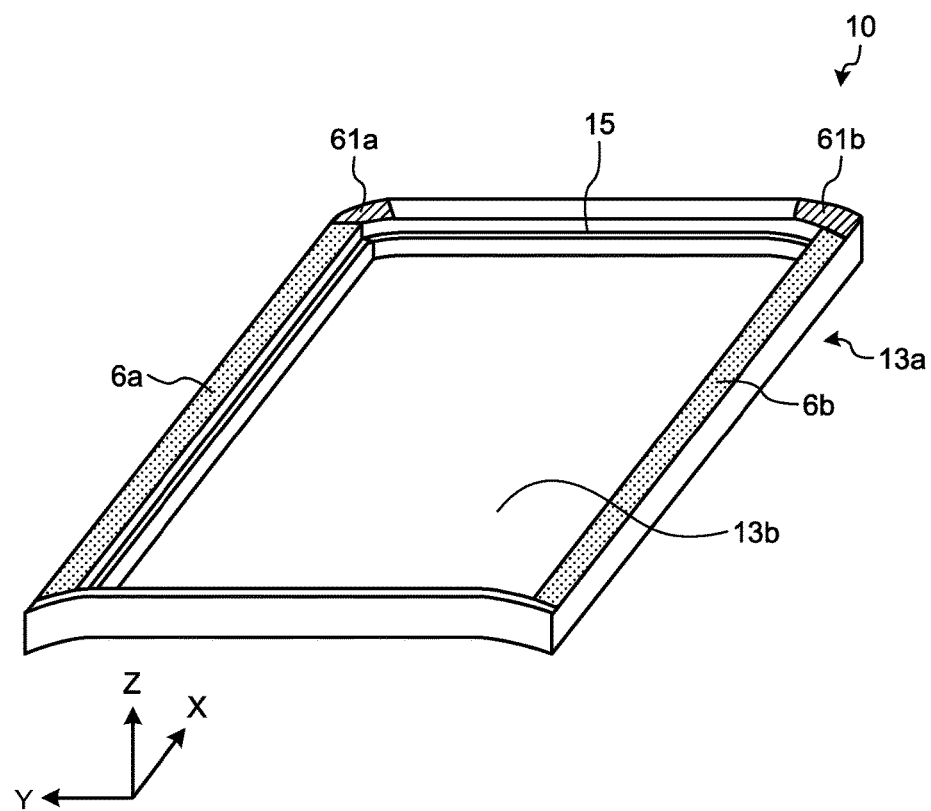
FIG. 6 is an explanatory diagram illustrating another mounting position of the fixing member in the frame.

In addition to the fixing members 6a and 6b, it may be possible to provide a new fixing member for fixing the upper diffusion sheet 5c on the upper end surface 12-1 of the frame member 12 and the upper end surface 13b-1 of the side wall 13a. This will be described below with reference to FIG. 6. FIG. 6 is a diagram for explaining other mounting positions of fixing members 61a and 61b in the frame 10.

The fixing members 61a and 61b are, for example, double-sided tapes or adhesive agents, and respectively arranged on both end portions of the upper end surface 12-1 of the frame member 12 and the upper end surface 13b-1 of the side wall 13a covered by the second light shielding sheet 21.

The fixing members 61a and 61b fix two corner portions of the upper diffusion sheet 5c covered by the second light shielding sheet 21 to the frame 10, to thereby prevent the upper diffusion sheet 5c from being removed or loosened from the frame 10.

In the planar illumination apparatus 1 according to the embodiment, the pair of end portions 5c-1 of the upper diffusion sheet 5c are fixed to the upper end surface 12-1 of the frame member 12 and the upper end surface 13b-1 of the side wall 13a via the fixing members 6a and 6b, respectively; however, the present invention is not limited to this embodiment.

As another embodiment, it may be possible to fix only the end portion 5c-1 on one side to the upper end surface 12-1 of the frame member 12 and the upper end surface 13b-1 of the side wall 13a via a fixing member. In this case, only the end portions 5a-1 and 5b-1 on one side of the lower diffusion sheet 5a and the prism sheet 5b are arranged in the notch portion 15.

Next, with reference to FIG. 7, a planar illumination apparatus 1a according to a first modification will be described. In the planar illumination apparatus 1a, a thickness d1 of a frame member 12a and between an upper end surface 13b-2 and a lower end surface 13c-2 of a side wall 13a-1 in a frame 10a is thinner than a thickness d2 of the light guide plate 4, and the lower diffusion sheet 5a located closest to the emission surface 4a is fixed to the frame 10a.

Figure 7:
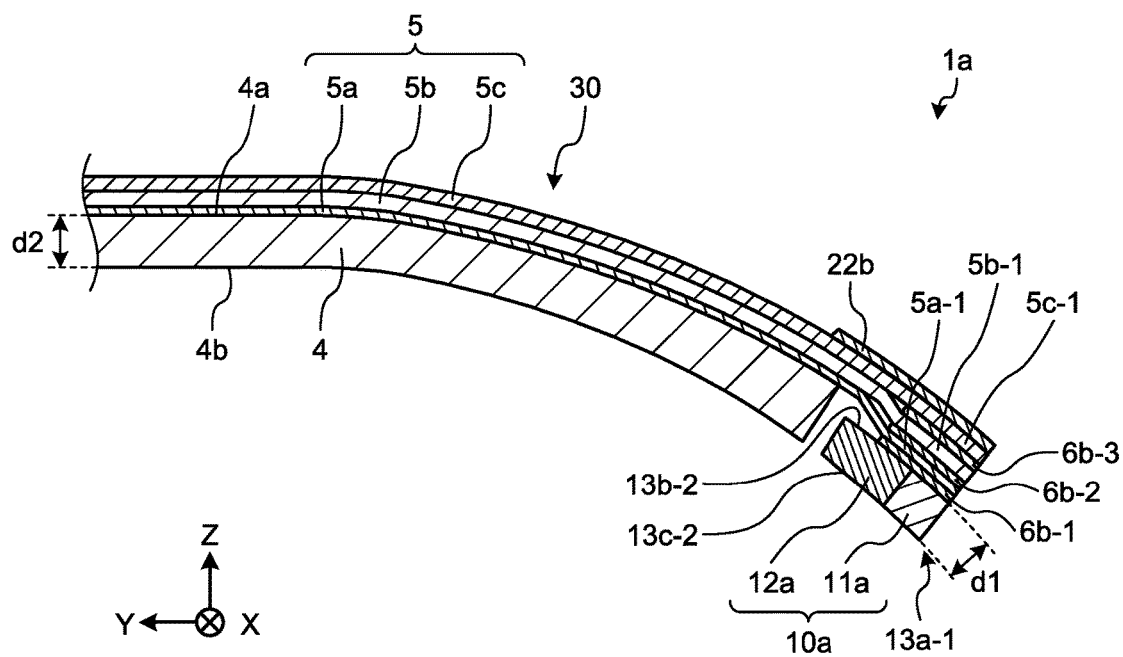
FIG. 7 is a schematic cross-sectional view of a planar illumination apparatus according to a first modification.

FIG. 7 is a diagram for explaining the planar illumination apparatus 1a according to the first modification. Components with the same functions as the components illustrated in FIG. 3 are denoted by the same reference signs illustrated in FIG. 3, and explanation thereof will be omitted.

FIG. 7 illustrates the one side wall 13a-1 of the pair of side walls 13a-1 of a case body 11a of the frame 10a. The other side wall 13a-1 has the same configuration as the one side wall 13a-1. The frame member 12a is provided on an inner peripheral surface of the case body 11a.

While the end portions 5a-1, 5b-1, and 5c-1 on one side of the lower diffusion sheet 5a, the prism sheet 5b, and the upper diffusion sheet 5c are illustrated in FIG. 7, configurations of the both ends of the lower diffusion sheet 5a, the prism sheet 5b, and the upper diffusion sheet 5c are the same; therefore, the end portions 5a-1, 5b-1, and 5c-1 on one side will be described below.

As illustrated in FIG. 7, in the planar illumination apparatus 1a according to the first modification, the thickness d1 of the frame member 12a and between the upper end surface 13b-2 and the lower end surface 13c-2 of the side wall 13a-1 in the frame 10a is set to be thinner than the thickness d2 of the light guide plate 4. Then, the end portion 5a-1 of the lower diffusion sheet 5a located on the side wall 13a-1 is fixed to the frame member 12a and the upper end surface 13b-2 of the side wall 13a-1 described above via a fixing member 6b-1.

In addition, the end portions 5b-1 and 5c-1 of the prism sheet 5b and the upper diffusion sheet 5c located on the side wall 13a-1 overlap with the end portion 5a-1 of the lower diffusion sheet 5a located on the side wall 13a-1. The end portions 5a-1, 5b-1, and 5c-1 are fixed to the frame member 12a and the upper end surface 13b-2 of the side wall 13a-1 by fixing members 6b-2 and 6b-3 via the end portion 5a-1 of the lower diffusion sheet 5a located on the side wall 13a-1.

As described above, in the planar illumination apparatus 1a according to the first modification, the end portion 5a-1 of the lower diffusion sheet 5a, which is located closest to the emission surface 4a among the plurality of optical sheets 5, is fixed to the frame member 12a and the upper end surface 13b-2 of the side wall 13a-1 via the fixing member 6b-1.

Furthermore, the end portions 5b-1 and 5c-1 of the prism sheet 5b and the upper diffusion sheet 5c are fixed to the frame member 12a and the upper end surface 13b-2 of the side wall 13a-1 by the fixing members 6b-2 and 6b-3 via the end portion 5a-1 of the lower diffusion sheet 5a.

Therefore, in the planar illumination apparatus 1a according to the first modification, fixation of the plurality of optical sheets 5 to the curved frame 10a can be realized by the fixing members 6b-1, 6b-2, and 6b-3.

That is, in the planar illumination apparatus 1a according to the first modification, the fixing member 6b-1 is directly bonded to the frame member 12a and the upper end surface 13b-2 of the side wall 13a, so that the end portion 5a-1 of the lower diffusion sheet 5a located closest to the emission surface 4a is firmly fixed.

Then, the end portions 5b-1 and 5c-1 of the prism sheet 5b and the upper diffusion sheet 5c are firmly fixed to the frame member 12a and the upper end surface 13b-2 of the side wall 13a-1 by the fixing members 6b-2 and 6b-3 via the end portion 5a-1 of the lower diffusion sheet 5a.

With this configuration, in the planar illumination apparatus 1a according to the first modification, it is possible to firmly fix the plurality of optical sheets 5a, 5b, and 5c to the frame 10a, and reduce a frame size of the curved frame 10a.

Furthermore, in the planar illumination apparatus 1a according to the first modification, the thickness d1 of the frame member 12a and between the upper end surface 13b-2 and the lower end surface 13c-2 of the side wall 13a-1 in the frame 10a is set to be thinner than the thickness d2 of the light guide plate 4. Therefore, the planar illumination apparatus 1a according to the first modification can be made thin.

Moreover, in the planar illumination apparatus 1a according to the first modification, it is possible to easily fix the end portion 5c-1 of the upper diffusion sheet 5c to the end portion 5b-1 of the prism sheet 5b.

That is, in the planar illumination apparatus 1a according to the first modification, it is possible to easily fix the plurality of optical sheets 5a, 5b, and 5c to the curved frame 10a. Consequently, it is possible to improve the productivity of the apparatus.

In the planar illumination apparatus 1a according to the first modification, the pair of end portions 5a-1 of the lower diffusion sheet 5a are fixed to the frame member 12a and the upper end surfaces 13b-2 of the side walls 13a-1 via the fixing members 6b-1; however, the present invention is not limited to this embodiment.

As another embodiment, it may be possible to fix only the end portion 5a-1 on one side to the frame member 12a and the upper end surface 13b-2 of the side wall 13a-1 via a fixing member. In this case, only the end portions 5b-1 and 5c-1 on one side of the prism sheet 5b and the upper diffusion sheet 5c overlap with the end portion 5a-1 on one side of the lower diffusion sheet 5a described above.

Furthermore, in the planar illumination apparatus 1a according to the first modification described above, the fixing members 6b-2 and 6b-3, which fix contact surfaces of the end portions 5a-1, 5b-1, and 5c-1 of the plurality of optical sheets 5a, 5b, and 5c, are arranged so as to extend from one end portion toward the other end portion; however, the present invention is not limited to this embodiment.

Figure 8:
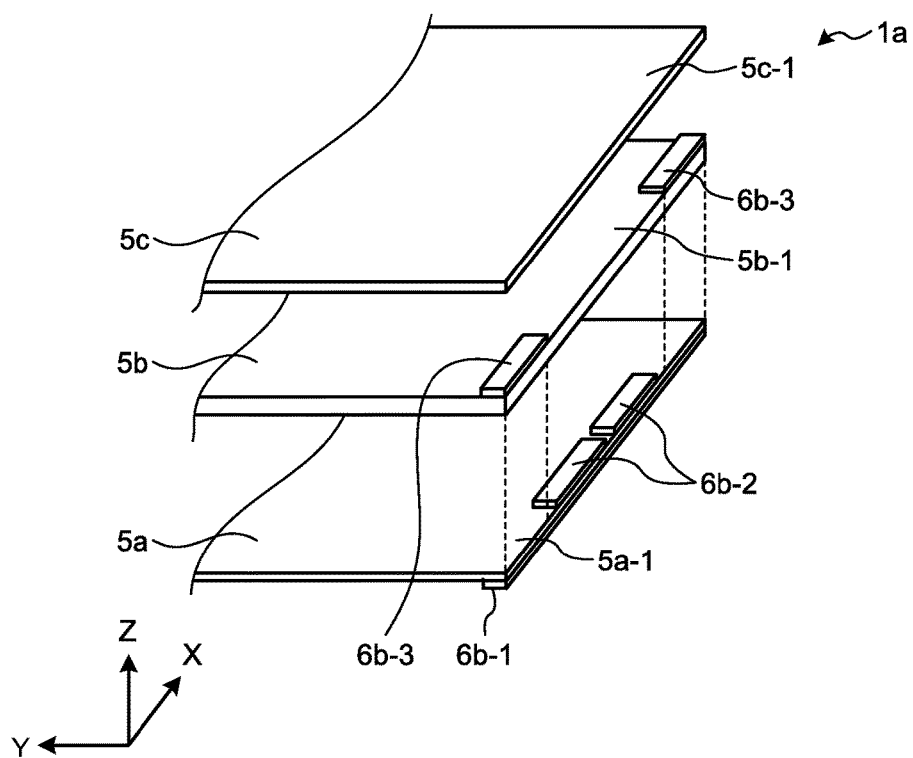
FIG. 8 is an explanatory diagram illustrating an example of an arrangement position of a fixing member according to a first modification.

With reference to FIG. 8, arrangement positions of the fixing members 6b-2 and 6b-3, which fix contact surfaces of the end portions 5a-1, 5b-1, and 5c-1 of the plurality of optical sheets 5a, 5b, and 5c that overlap with one another as viewed in a plan view, will be described.

FIG. 8 is an explanatory diagram illustrating an example of the arrangement positions of the fixing members 6b-2 and 6b-3 according to the first modification. FIG. 8 illustrates the fixing members 6b-2 and 6b-3 arranged on the one side wall 13a-1 of the pair of side walls 13a-1 of the case body 11a of the frame 10a; however, the arrangement relationship of the other side wall 13a-1 is the same as that of the one side wall 13a-1. In FIG. 8, the side wall 13a-1 is not illustrated for convenience of explanation.

Furthermore, while the end portions 5a-1, 5b-1, and 5c-1 on one side of the lower diffusion sheet 5a, the prism sheet 5b, and the upper diffusion sheet 5c are illustrated in FIG. 8, configurations of the both ends of the lower diffusion sheet 5a, the prism sheet 5b, and the upper diffusion sheet 5c are the same; therefore, the end portions 5a-1, 5b-1, and 5c-1 on one side will be described below.

As illustrated in FIG. 8, the fixing members 6b-2 and 6b-3, which fix the contact surfaces of the end portions 5a-1, 5b-1, and 5c-1 of the plurality of optical sheets 5a, 5b, and 5c located on the side wall 13a-1, are arranged at positions that do not overlap with each other as viewed in a plan view.

Specifically, in this example, the fixing members 6b-2 are arranged in an approximately central portion of the end portion 5a-1 of the lower diffusion sheet 5a. The fixing members 6b-3 are arranged at corner portions of the end portion 5b-1 of the prism sheet 5b.

In this embodiment, it is possible to prevent an increase in the thickness at an edge portion of the frame 10a due to overlapping of the fixing members 6b-1, 6b-2, and 6b-3.

Furthermore, as another embodiment, it may be possible to provide convex portions that extend in the horizontal direction with respect to the prism sheet 5b and the upper diffusion sheet 5c, at different positions on the end portions 5b-1 and 5c-1 of the prism sheet 5b and the upper diffusion sheet 5c. Then, the convex portions may be fixed to the lower diffusion sheet 5a by the fixing members 6b-2. This embodiment will be described with reference to FIG. 9.

Figure 9:
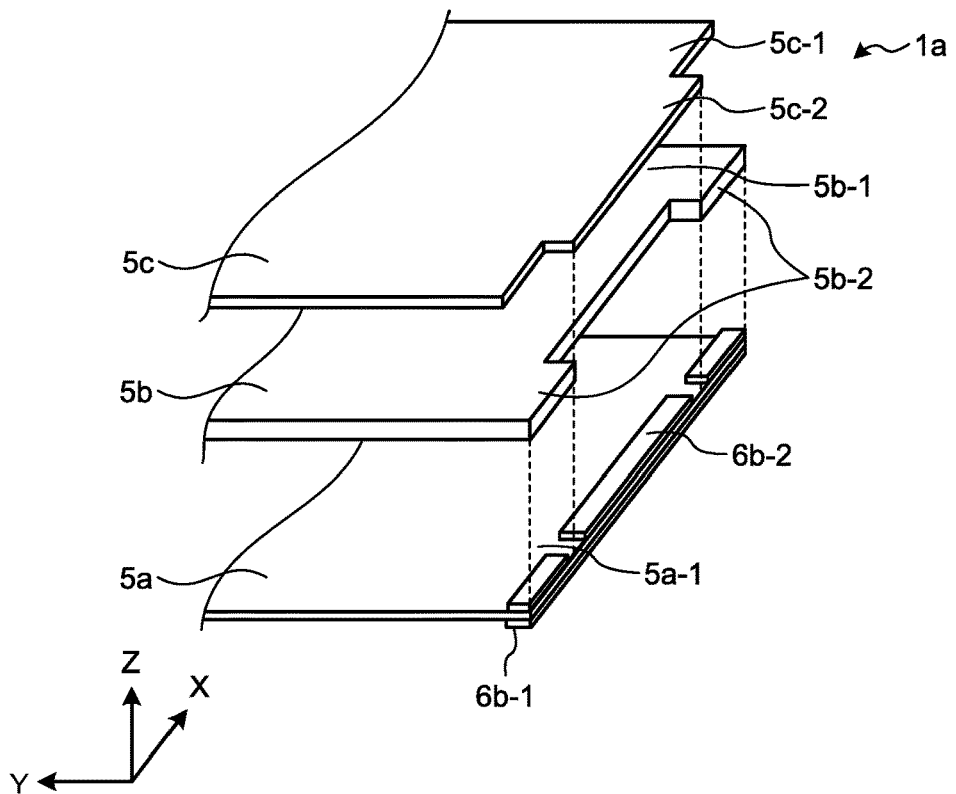
FIG. 9 is a diagram for explaining another embodiment of the first modification.

FIG. 9 is a diagram for explaining another embodiment of the first modification. FIG. 9 illustrates convex portions 5b-2 and 5c-2 provided on the one end portions 5b-1 and 5c-1 of the pairs of end portions 5b-1 and 5c-1 of the prism sheet 5b and the upper diffusion sheet 5c. In the other end portions 5b-1 and 5c-1, the convex portions 5b-2 and 5c-2 are provided similarly to the one end portions 5b-1 and 5c-1. In FIG. 9, the side wall 13a-1 is not illustrated for convenience of explanation.

Furthermore, while the end portions 5a-1, 5b-1, and 5c-1 on one side of the lower diffusion sheet 5a, the prism sheet 5b, and the upper diffusion sheet 5c are illustrated in FIG. 9, configurations of the both ends of the lower diffusion sheet 5a, the prism sheet 5b, and the upper diffusion sheet 5c are the same; therefore, the end portions 5a-1, 5b-1, and 5c-1 on one side will be described below.

As illustrated in FIG. 9, the convex portions 5b-2 and 5c-2, which extend in the horizontal direction with respect to the prism sheet 5b and the upper diffusion sheet 5c, are provided at different positions on the end portions 5b-1 and 5c-1 of the prism sheet 5b and the upper diffusion sheet 5c. The convex portions 5b-2 and 5c-2 are fixed to the lower diffusion sheet 5a by the fixing members 6b-2.

Specifically, in this example, the convex portions 5b-2 are provided at the respective corner portions of the end portion 5b-1 of the prism sheet 5b. The convex portion 5c-2 is provided in an approximately central portion of the end portion 5c-1 of the upper diffusion sheet 5c.

In this embodiment, the end portion 5b-1 of the prism sheet 5b and the end portion 5c-1 of the upper diffusion sheet 5c can be made flush with each other in the edge portion of the frame 10a. With this configuration, it is possible to prevent an increase in the thickness due to overlapping of the plurality of optical sheets 5a, 5b, and 5c.

Next, with reference to FIG. 10, a planar illumination apparatus 1b according to a second modification will be described. In the planar illumination apparatus 1b, an upper end surface 16 of a side wall 13a-2 of a frame 10b includes a tapered surface 10c, and the pair of end portions 5a-1 of the lower diffusion sheet 5a are fixed to the tapered surface 10c.

Figure 10:
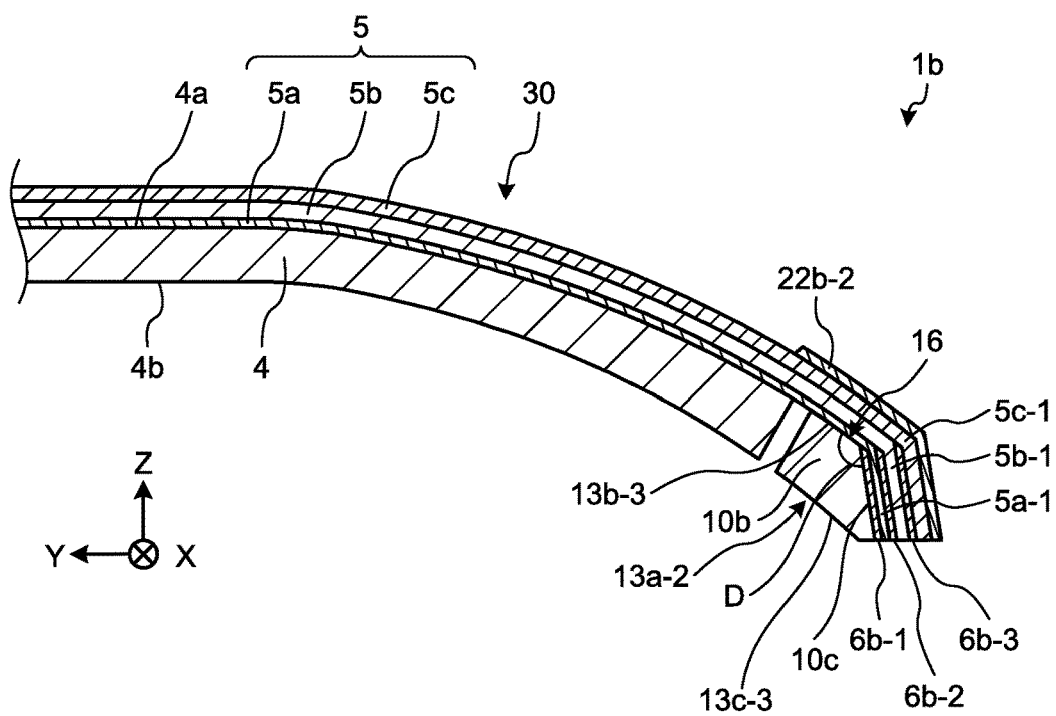
FIG. 10 is a schematic cross-sectional view of a planar illumination apparatus according to a second modification.

FIG. 10 is a diagram for explaining the planar illumination apparatus 1b according to the second modification. Components with the same functions as those of the components illustrated in FIG. 3 are denoted by the same reference signs illustrated in FIG. 3, and explanation thereof will be omitted.

FIG. 10 illustrates the one side wall 13a-2 of the pair of side walls 13a-2 of the frame 10b. The other side wall 13a-2 has the same configuration as the one side wall 13a-2. In this example, the frame 10b is constituted by only a case body. That is, the side wall 13a-2 is a side wall of the case body.

As illustrated in FIG. 10, in the planar illumination apparatus 1b according to the second modification, the side wall 13a-2 of the frame 10b includes the upper end surface 16. The upper end surface 16 includes a receiving surface 13b-3 and the tapered surface 10c. The receiving surface 13b-3 is a surface provided so as to be flat along the emission surface 4a of the light guide plate 4. The tapered surface 10c is a surface provided so as to be inclined in a direction away from the receiving surface 13b-3 (the emission surface 4a of the light guide plate 4) (in the direction toward a lower end surface 13c-3 of the side wall 13a-2). As in the example illustrated in FIG. 10, it is preferable that the tapered surface 10c is inclined in the direction away from the light guide plate 4. That is, it is preferable that an angle D between the receiving surface 13b-3 and the tapered surface 10c is an obtuse angle.

Furthermore, the end portions 5b-1 and 5c-1 of the prism sheet 5b and the upper diffusion sheet 5c overlap with the end portion 5a-1 of the lower diffusion sheet 5a. The end portions 5a-1, 5b-1, and 5c-1 are fixed to the tapered surface 10c, which is a part of the upper end surface 16, by the fixing members 6b-2 and 6b-3 via the end portion 5a-1 of the lower diffusion sheet 5a.

Moreover, in the planar illumination apparatus 1b according to the second modification, a third light shielding sheet 22b-2 is arranged so as to cover the upper end surface 16 of the side wall 13a-2.

As described above, in the planar illumination apparatus 1b according to the second modification, the end portion 5a-1 of the lower diffusion sheet 5a, which is located closest to the emission surface 4a among the plurality of optical sheets 5a, 5b, and 5c, is fixed to the tapered surface 10c via the fixing member 6b-1.

Furthermore, the end portions 5b-1 and 5c-1 of the prism sheet 5b and the upper diffusion sheet 5c are fixed to the tapered surface 10c by the fixing members 6b-2 and 6b-3 via the end portion 5a-1 of the lower diffusion sheet 5a.

Therefore, in the planar illumination apparatus 1b according to the second modification, fixation of the plurality of optical sheets 5a, 5b, and 5c to the curved frame 10b can be realized by the fixing members 6b-1, 6b-2, and 6b-3.

That is, in the planar illumination apparatus 1b according to the second modification, the fixing member 6b-1 is directly bonded to the tapered surface 10c, so that the end portion 5a-1 of the lower diffusion sheet 5a located closest to the emission surface 4a is firmly fixed.

Furthermore, the end portions 5b-1 and 5c-1 of the prism sheet 5b and the upper diffusion sheet 5c are firmly fixed to the tapered surface 10c by the fixing members 6b-2 and 6b-3 via the end portion 5a-1 of the lower diffusion sheet 5a.

With this configuration, in the planar illumination apparatus 1b according to the second modification, it is possible to firmly fix the plurality of optical sheets 5a, 5b, and 5c to the frame 10b, and reduce a frame size of the curved frame 10b.

Furthermore, in the planar illumination apparatus 1b according to the second modification, the upper end surface 16 of the side wall 13a-2 of the frame 10b has the tapered surface 10c.

With this configuration, in the planar illumination apparatus 1b according to the second modification, the end portion 5a-1 of the lower diffusion sheet 5a is bent from the receiving surface 13b-3 that is flat along the emission surface 4a of the light guide plate 4, and fixed to the tapered surface 10c via the fixing member 6b-1. Therefore, it is possible to firmly fix the lower diffusion sheet 5a to the frame 10b.

Moreover, in the planar illumination apparatus 1b according to the second modification, the lower diffusion sheet 5a is less likely to be removed at the edge portion of the frame 10b. Therefore, it is possible to easily fix the end portion 5b-1 of the prism sheet 5b to the end portion 5a-1 of the lower diffusion sheet 5a.

That is, in the planar illumination apparatus 1b according to the second modification, it is possible to easily fix the plurality of optical sheets 5a, 5b, and 5c to the curved frame 10b. Consequently, it is possible to improve the productivity of the apparatus.

Furthermore, in the planar illumination apparatus 1b according to the second modification, the curved frame 10b is constituted by only the case body. The case body can be processed easily. Therefore, the curved frame 10b can be made thin.

The curved frame 10b has been explained to be constituted by the case body; however, the curved frame 10b may be constituted by both of the case body and the frame member. In this case, the frame member is arranged along a part of an inner surface of the case body, which does not face the LEDs 2. Thus, the above side wall 13a-2 of the frame 10b is constituted by both of the case body and the frame member.

In the planar illumination apparatus 1b according to the second modification, the fixing member 6b-1 is mounted on the tapered surface 10c in the frame 10b. However, it is possible to additionally mount the fixing member 6b-1 on the receiving surface 13b-3.

In this case, it is preferable to reduce a height of the receiving surface 13b-3 by the thickness of the fixing member 6b-1.

Furthermore, in the planar illumination apparatus 1b according to the second modification, the end portion 5a-1 of the lower diffusion sheet 5a is fixed to the tapered surface 10c via the fixing member 6b-1; however, the present invention is not limited to this embodiment.

As another embodiment, it is possible to fix the end portion 5c-1 of the upper diffusion sheet 5c to the tapered surface 10c via the fixing member 6b-1. In this case, the end portions 5a-1 and 5b-1 of the lower diffusion sheet 5a and the prism sheet 5b are arranged on the receiving surface 13b-3.

By fixing the upper diffusion sheet 5c to the frame 10b as described above, the lower diffusion sheet 5a and the prism sheet 5b are pressed by the upper diffusion sheet 5c and fixed to the frame 10b.

Even in this embodiment, similarly to the above, it is possible to firmly fix the plurality of optical sheets 5a, 5b, and 5c to the frame 10b, and reduce a frame size of the curved frame 10b.

Furthermore, in the planar illumination apparatus 1b according to the second modification, the pair of end portions 5a-1 of the lower diffusion sheet 5a are fixed to the tapered surfaces 10c via the fixing members 6b-1; however, the present invention is not limited to this embodiment.

As another embodiment, it may be possible to fix only the end portion 5a-1 on one side to the tapered surface 10c via a fixing member. In this case, only the end portions 5b-1 and 5c-1 on one side of the prism sheet 5b and the upper diffusion sheet 5c overlap with the end portion 5a-1 on one side of the lower diffusion sheet 5a described above.

Next, with reference to FIG. 11, FIG. 12, and FIG. 13A to FIG. 13C, a planar illumination apparatus 1c according to a third modification will be described. In the planar illumination apparatus 1c, an optical sheet of any of the lower diffusion sheet 5a, the prism sheet 5b, and the upper diffusion sheet 5c is fixed depending on a position in a frame 10d.

Figure 11:
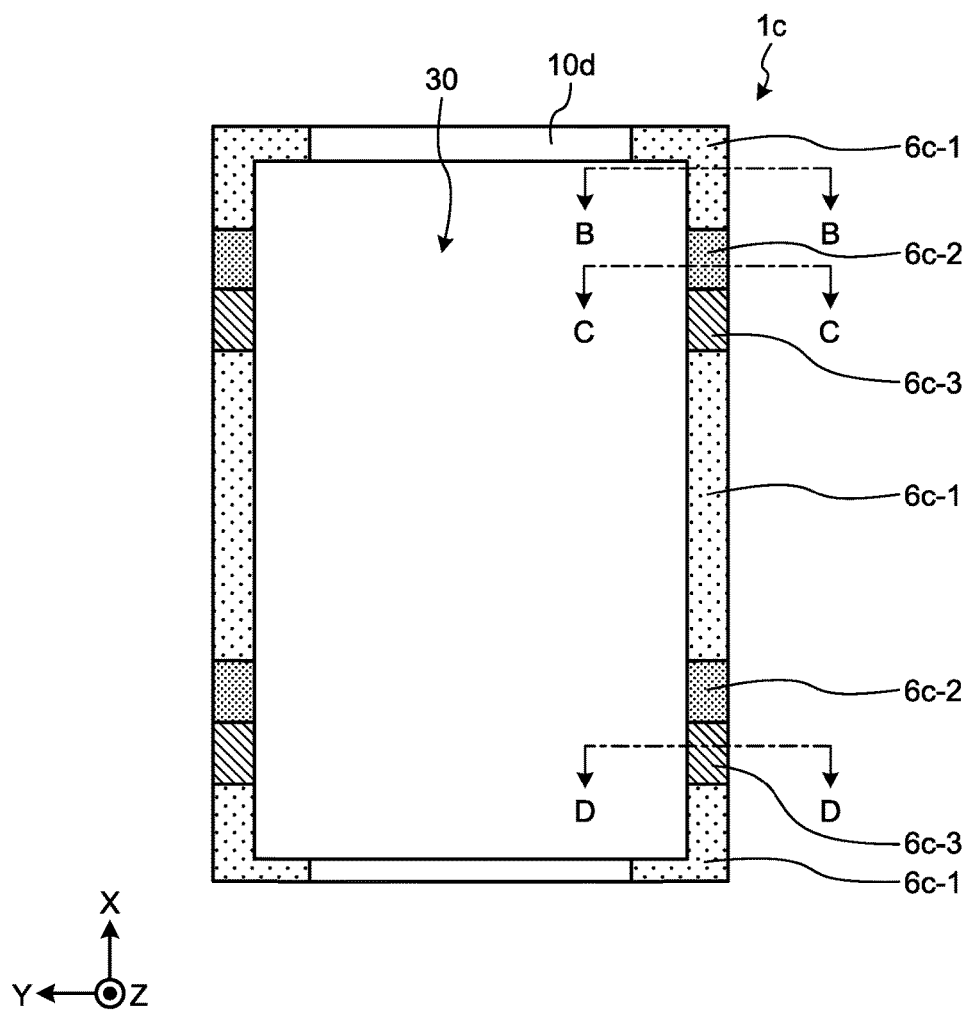
FIG. 11 is a plan view illustrating an example of an external appearance of a planar illumination apparatus according to a third modification.

FIG. 11 is a plan view illustrating an example of an external appearance of the planar illumination apparatus 1c according to the third modification. In FIG. 11, arrangement positions of fixing members 6c-1, 6c-2, and 6c-3 in the frame 10d are illustrated. Structures for arranging the fixing members 6c-1, 6c-2, and 6c-3 in the frame 10d are different from one another.

Figure 12:
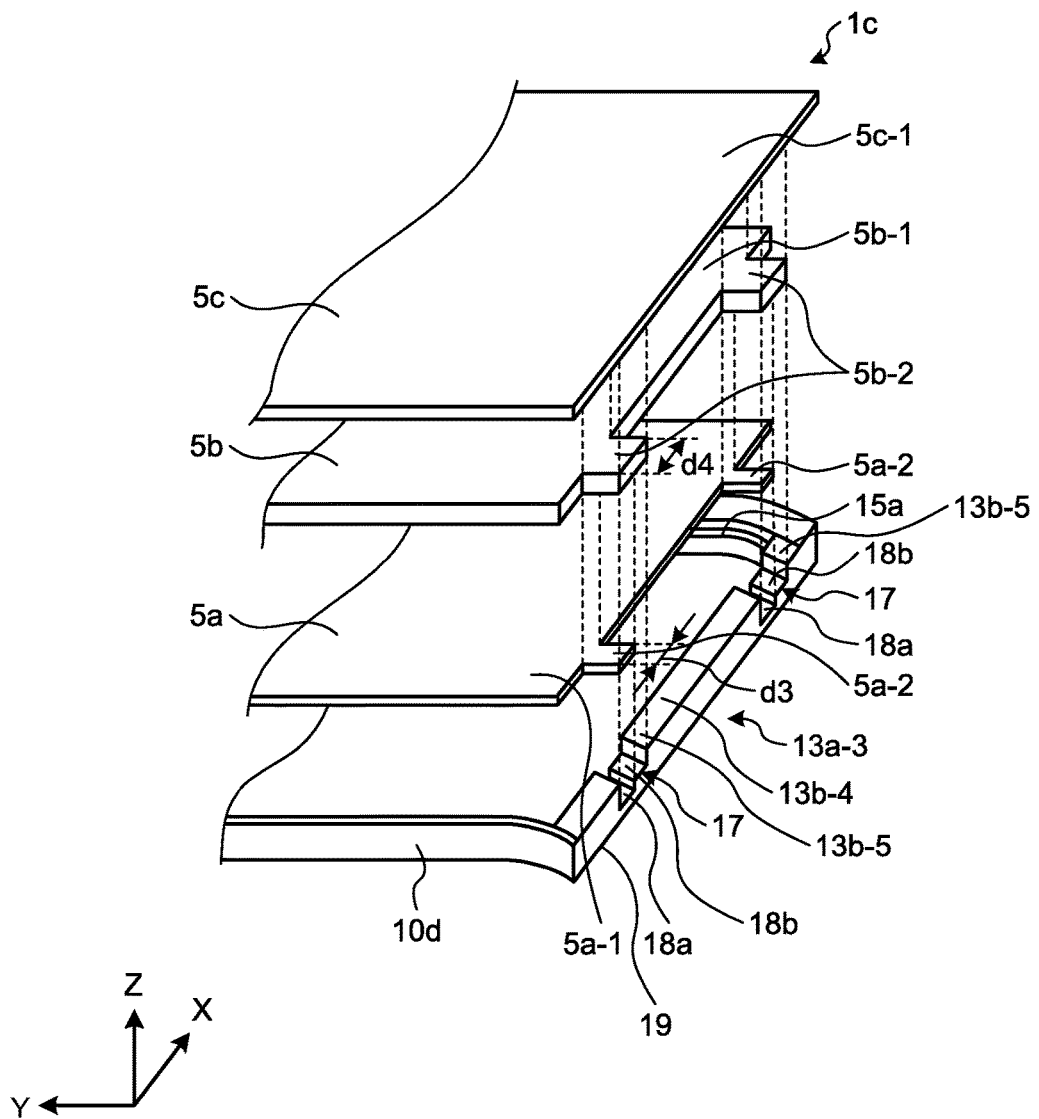
FIG. 12 is an explanatory diagram illustrating an arrangement relationship of an optical sheet according to the third modification.

FIG. 12 is an explanatory diagram illustrating an arrangement relationship of the optical sheets 5 according to the third modification. Specifically, FIG. 12 illustrates an arrangement relationship of the lower diffusion sheet 5a, the prism sheet 5b, and the upper diffusion sheet 5c that are fixed to the frame 10d via the fixing members 6c-1, 6c-2, and 6c-3. In FIG. 12, structures of the frame 10d for fixing the lower diffusion sheet 5a, the prism sheet 5b, and the upper diffusion sheet 5c via the fixing members 6c-1, 6c-2, and 6c-3 are also illustrated.

While the end portions 5a-1, 5b-1, and 5c-1 on one side of the lower diffusion sheet 5a, the prism sheet 5b, and the upper diffusion sheet 5c are illustrated in FIG. 12, configurations of the both ends of the lower diffusion sheet 5a, the prism sheet 5b, and the upper diffusion sheet 5c are the same; therefore, the end portions 5a-1, 5b-1, and 5c-1 on one side will be described below.

As illustrated in FIG. 12, the convex portions 5b-2 that extend in the horizontal direction with respect to the prism sheet 5b are provided in the vicinity of the corner portions of the end portion 5b-1 of the prism sheet 5b. Furthermore, convex portions 5a-2 that extend in the horizontal direction with respect to the lower diffusion sheet 5a are provided in the vicinity of corner portions of the end portion 5a-1 of the lower diffusion sheet 5a. The convex portions 5a-2 are provided at positions corresponding to the convex portions 5b-2 provided on the prism sheet 5b. Moreover, widths d3 of the convex portions 5a-2 are set to be narrower than widths d4 of the convex portions 5b-2. In this example, the convex portions 5a-2 are provided so as to cover one side half regions of the convex portions 5b-2.

The fixing members 6c-1 are provided at positions that do not overlap with the convex portions 5b-2 provided on the prism sheet 5b, on the end portion 5c-1 of the upper diffusion sheet 5c. Furthermore, the fixing members 6c-2 are provided at positions that do not overlap with the convex portions 5a-2 provided on the lower diffusion sheet 5a, on the convex portions 5b-2 provided on the prism sheet 5b. Moreover, the fixing members 6c-3 are provided at positions of the convex portion 5a-2 provided on the lower diffusion sheet 5a.

In addition, as illustrated in FIG. 12, stepped-shaped notch portions 17 for accommodating the convex portions 5a-2 and 5b-2 are provided at positions corresponding to the convex portions 5a-2 provided on the lower diffusion sheet 5a and the convex portions 5b-2 provided on the prism sheet 5b, on a side wall 13a-3 of the frame 10d. The fixing members 6c-3 are provided on stepped surfaces 18a of the first step, which are located closest to a lower end surface 19 opposite to an upper end surface 13b-4 of the side wall 13a-3 in the notch portions 17. Furthermore, the fixing members 6c-2 are provided on stepped surfaces 18b, which are located in a direction away from the lower end surface 19 and located on the second step that is one step higher than the stepped surfaces 18a of the first step in the notch portions 17. The stepped surfaces 18a of the first step and the stepped surfaces 18b of the second step form a part of the upper end surface 13b-4 of the side wall 13a-3. Moreover, surfaces 13b-5, which are located in a direction away from the lower end surface 19 and correspond to the uppermost step that is one step higher than the stepped surfaces 18b of the second step, are included in the upper end surface 13b-4 of the side wall 13a-3. The fixing members 6c-1 are provided at positions at which the notch portions 17 are not provided on the upper end surface 13b-4 of the side wall 13a-3 in the frame 10d.

As described above, in the notch portions 17 provided on the side wall 13a-3 of the frame 10d, the convex portions 5a-2 provided on the lower diffusion sheet 5a are fixed to the stepped surfaces 18a of the first step via the fixing members 6c-3, and the convex portions 5b-2 provided on the prism sheet 5b are fixed to the stepped surfaces 18b of the second step via the fixing members 6c-2.

Next, with reference to FIG. 13A to FIG. 13C, structures of portions on which the fixing members 6c-1, the fixing members 6c-2, and the fixing members 6c-3 are arranged in the frame 10d in the planar illumination apparatus 1c according to the third modification will be described in detail.

Components with the same functions as the components illustrated in FIG. 3 are denoted by the same reference signs illustrated in FIG. 3, and explanation thereof will be omitted. While the one side wall 13a-3 of the pair of side walls 13a-3 in the frame 10d is illustrated in FIG. 13A to FIG. 13C, a configuration of the other side wall 13a-3 is the same as the configuration of the one side wall 13a-3.

Figure 13A:
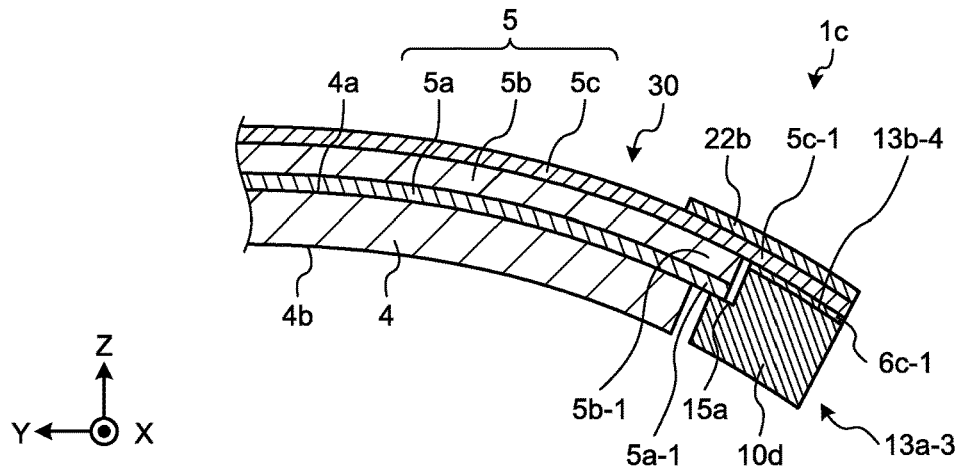
FIG. 13A is a schematic cross-sectional view taken along a line B-B in FIG. 11.
Figure 13B:
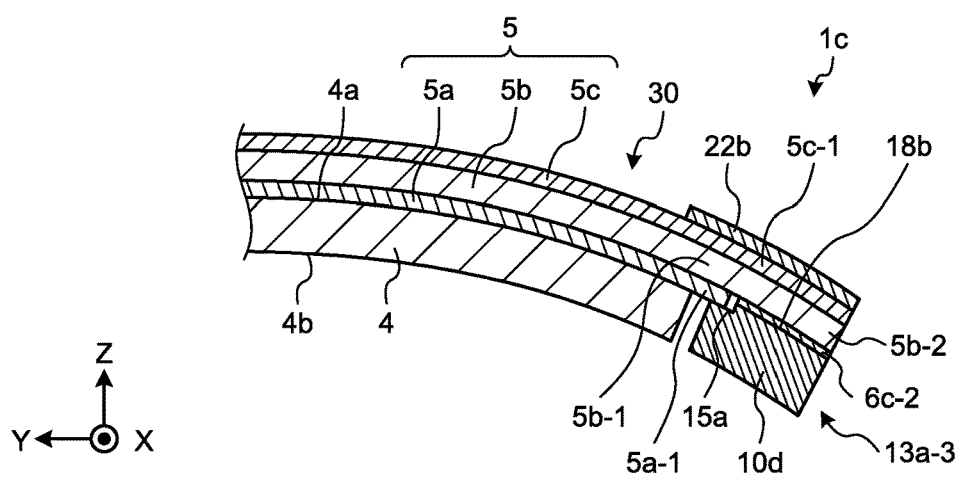
FIG. 13B is a schematic cross-sectional view taken along a line C-C in FIG. 11.
Figure 13C:
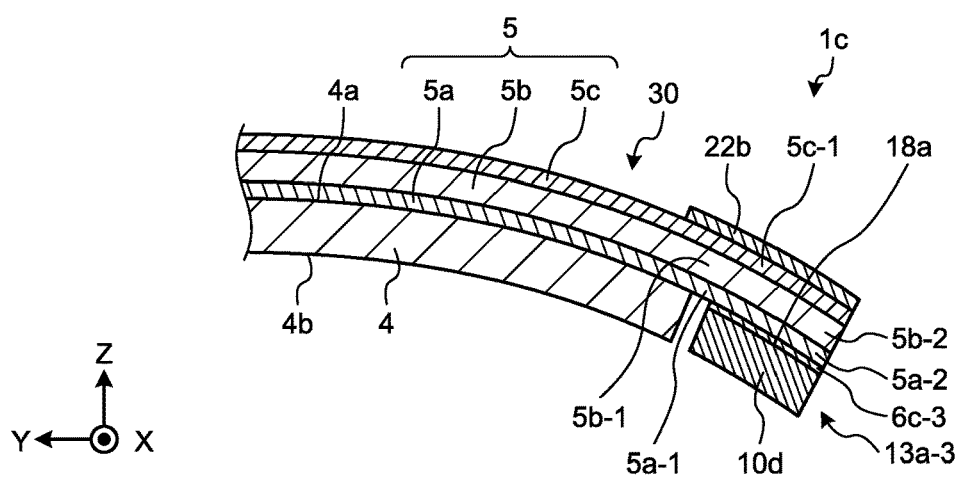
FIG. 13C is a schematic cross-sectional view taken along a line D-D in FIG. 11.

Furthermore, while the end portions 5a-1, 5b-1, and 5c-1 on one side of the lower diffusion sheet 5a, the prism sheet 5b, and the upper diffusion sheet 5c are illustrated in FIG. 13A to FIG. 13C, configurations of the both ends of the lower diffusion sheet 5a, the prism sheet 5b, and the upper diffusion sheet 5c are the same; therefore, the end portions 5a-1, 5b-1, and 5c-1 on one side will be described below.

First, with reference to FIG. 13A, a structure of a portion of the frame 10d in which the fixing member 6c-1 is mounted in the planar illumination apparatus 1c according to the third modification will be described. FIG. 13A is a schematic cross-sectional view taken along a line B-B in FIG. 11.

As illustrated in FIG. 13A, in the portion of the frame 10d, the end portion 5c-1 of the upper diffusion sheet 5c is fixed to the upper end surface 13b-4 of the side wall 13a-3 via the fixing member 6c-1. Furthermore, the end portion 5a-1 of the lower diffusion sheet 5a and the end portion 5b-1 of the prism sheet 5b are arranged in a notch portion 15a, which is provided in an upper part of the inner peripheral side of the frame 10d, in the manner of being pressed by the upper diffusion sheet 5c. The surface of the prism sheet 5b and the surface of the fixing member 6c-1 arranged in the notch portion 15a are flush with each other.

With this configuration, in the portion of the frame 10d, the fixing member 6c-1 is directly bonded to the upper end surface 13b-4 of the side wall 13a-3, so that the end portion 5c-1 of the upper diffusion sheet 5c is firmly fixed. The fixing member 6c-1 bonds and fixes the upper diffusion sheet 5c to the frame 10d as final fixation (see FIG. 11).

Next, with reference to FIG. 13B, a structure of a portion of the frame 10d in which the fixing member 6c-2 is mounted in the planar illumination apparatus 1c according to the third modification will be described. FIG. 13B is a schematic cross-sectional view taken along a line C-C in FIG. 11.

As illustrated in FIG. 13B, in the portion of the frame 10d, the convex portion 5b-2 provided on the end portion 5b-1 of the prism sheet 5b is fixed to the stepped surface 18b of the second step via the fixing member 6c-2. Furthermore, the end portion 5a-1 of the lower diffusion sheet 5a is arranged in the notch portion 15a, which is provided in an upper part of the inner peripheral side of the frame 10d, in the manner of being presses by the prism sheet 5b. The surface of the lower diffusion sheet 5a and the surface of the fixing member 6c-2 arranged in the notch portion 15a are flush with each other. Furthermore, the end portion 5c-1 of the upper diffusion sheet 5c located on the side wall 13a-3 overlaps with the convex portion 5b-2 of the prism sheet 5b located on the side wall 13a-3.

With this configuration, in the portion of the frame 10d, the fixing member 6c-2 is directly bonded to the stepped surface 18b of the second step, so that the convex portion 5b-2 provided on the end portion 5b-1 of the prism sheet 5b is firmly fixed. The fixing member 6c-2 bonds and fixes the prism sheet 5b to the frame 10d as temporary fixation (see FIG. 11).

Next, with reference to FIG. 13C, a structure of a portion of the frame 10d in which the fixing member 6c-3 is mounted in the planar illumination apparatus 1c according to the third modification will be described. FIG. 13C is a schematic cross-sectional view taken along a line D-D in FIG. 11.

As illustrated in FIG. 13C, in the portion of the frame 10d, the convex portion 5a-2 provided on the end portion 5a-1 of the lower diffusion sheet 5a is fixed to the stepped surface 18a of the first step via the fixing member 6c-3. The emission surface 4a of the light guide plate 4 and the surface of the fixing member 6c-3 are flush with each other. The convex portion 5b-2 of the prism sheet 5b located on the side wall 13a-3 and the end portion 5c-1 of the upper diffusion sheet 5c located on the side wall 13a-3 overlap with the convex portion 5a-2 of the lower diffusion sheet 5a located on the side wall 13a-3.

With this configuration, in the portion of the frame 10d, the fixing member 6c-3 is directly bonded to the stepped surface 18a of the first step, so that the convex portion 5a-2 provided on the end portion 5a-1 of the lower diffusion sheet 5a is firmly fixed. The fixing member 6c-3 bonds and fixes the lower diffusion sheet 5a to the frame 10d as temporary fixation (see FIG. 11).

As described above, in the planar illumination apparatus 1c according to the third modification, the convex portions 5a-2 provided on the end portion 5a-1 of the optical sheet 5a are fixed to the stepped surfaces 18a of the first step via the fixing members 6c-3. Furthermore, the convex portions 5b-2 provided on the end portion 5b-1 of the optical sheet 5b are fixed to the stepped surfaces 18b of the second step via the fixing members 6c-2. Moreover, the end portion 5c-1 of the optical sheet 5c is fixed to the upper end surface 13b-4 of the side wall 13a-3 via the fixing member 6c-1.

Therefore, in the planar illumination apparatus 1c according to the third modification, fixation of the plurality of optical sheets 5 to the curved frame 10d can be realized by the fixing members 6c-1, 6c-2, and 6c-3.

That is, in the planar illumination apparatus 1c according to the third modification, the end portion 5c-1 of the upper diffusion sheet 5c is firmly fixed to the upper end surface 13b-4 of the side wall 13a-3 by the fixing member 6c-1 as final fixation. Furthermore, the convex portions 5a-2 and 5b-2 provided on the end portions 5a-1 and 5b-1 of the lower diffusion sheet 5a and the prism sheet 5b are firmly fixed to the stepped surfaces 18a of the first step and the stepped surfaces 18b of the second step by the fixing members 6c-2 and 6c-3 as temporary fixation.

With this configuration, in the planar illumination apparatus 1c according to the third modification, it is possible to firmly fix the plurality of optical sheets 5a, 5b, and 5c to the frame 10d, and reduce a frame size of the curved frame 10d.

Furthermore, in the planar illumination apparatus 1c according to the third modification, the convex portions 5a-2 provided on the end portion 5a-1 of the optical sheet 5a, the convex portions 5b-2 provided on the end portion 5b-1 of the optical sheet 5b, and the end portion 5c-1 of the optical sheet 5c are fixed to the frame 10d via the fixing members 6c-1, 6c-2, and 6c-3 in order from the optical sheet 5a located closest to the emission surface 4a.

That is, in the planar illumination apparatus 1c according to the third modification, the optical sheets 5a, 5b, and 5c are less likely to be deviated at the time of assembly, and it is possible to easily fix the plurality of optical sheets 5a, 5b, and 5c to the curved frame 10d. Consequently, it is possible to improve the productivity of the apparatus.

In the planar illumination apparatus 1c according to the third modification, the fixing members 6c-2 and 6c-3 for temporary fixation are provided at two positions in the vicinity of each of the ends of the frame 10d in the long side direction (the X-axis direction) (see FIG. 11); however, it is possible to provide the fixing members 6c-2 and 6c-3 for temporary fixation between the two positions. Furthermore, the convex portions 5a-2 and 5b-2 are provided on the end portions 5a-1 and 5b-1 of the lower diffusion sheet 5a and the prism sheet 5b in accordance with the positions at which the fixing members 6c-2 and 6c-3 are provided. Moreover, the stepped-shaped notch portions 17 for accommodating the convex portions 5a-2 and 5b-2 are provided on the side wall 13a-3 of the frame 10d at positions corresponding to the convex portions 5a-2 and 5b-2.

In addition, in the planar illumination apparatus 1c according to the third modification, an example has been described in which the notch portions 17 are provided at two positions; however, the shapes of the notch portions 17 at the two positions are not limited to the example illustrated in FIG. 12. For example, the notch portions 17 at the two positions may be formed such that steps lead to upward along a direction in which the steps come close to each other, or such that steps lead to upward along a direction in which the steps are separated from each other. That is, the stepped surfaces 18b of the second step at the two positions may be provided at positions sandwiched between the stepped surfaces 18a of the first step at the two positions, or the stepped surfaces 18a of the first step at the two positions may be provided at positions sandwiched between the stepped surfaces 18b of the second step at the two positions.

In this case, it is possible to reliably prevent the lower diffusion sheet 5a and the prism sheet 5b from being separated and floating from the frame 10d at the time of assembly.

In the planar illumination apparatus 1c according to the third modification, the convex portions 5a-2 and 5b-2 provided on the respective pairs of end portions 5a-1 and 5b-1 of the lower diffusion sheet 5a and the prism sheet 5b are provided on the stepped surfaces 18a of the first step and the stepped surfaces 18b of the second step via the fixing members 6c-2 and 6c-3, and the pair of end portions 5c-1 of the upper diffusion sheet 5c are fixed to the upper end surfaces 13b-4 of the side walls 13a-3 via the fixing members 6c-1; however, the present invention is not limited to this example.

As another embodiment, it may be possible to fix only the convex portions 5a-2 and 5b-2 on one side of the end portions 5a-1 and 5b-1 to the stepped surfaces 18a of the first step and the stepped surfaces 18b of the second step via the fixing members 6c-2 and 6c-3, and fix only the end portion 5c-1 on one side to the upper end surface 13b-4 of the side wall 13a-3 via the fixing member 6c-1.

Furthermore, in the planar illumination apparatuses 1, 1a, 1b, and 1c according to the embodiments described above, the third light shielding sheets 22a, 22b, and 22b-2 are used; however, the present invention is not limited to this example. As another embodiment, it may be possible to apply black print to portions of the pair of end portions 5c-1 of the upper diffusion sheet 5c in order to block light, without using the third light shielding sheets 22a, 22b, and 22b-2.

Moreover, in the planar illumination apparatuses 1, 1a, 1b, and 1c according to the embodiments described above, an example has been described in which the edge portions of the emission surface 4a of the light guide plate 4 are curved. However, it is possible to implement the same configuration as described above even when the entire surface of the emission surface 4a of the light guide plate 4 is curved.

Furthermore, in the embodiments as described above, the three optical sheets 5, in which the lower diffusion sheet 5a, the prism sheet 5b, and the upper diffusion sheet 5c are deposited in this order from the emission surface 4a side, is used; however, the present invention is not limited to this example. For example, the three optical sheets, in which a reflection/deflection sheet, a diffusion sheet, and a prism sheet are deposited in this order from the emission surface 4a side, may be used. Moreover, the number of the optical sheets is not limited to three.

According to an embodiment of the present invention, it is possible to reduce a frame size of the curved frame.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A planar illumination apparatus comprising:
    a frame including a bottom surface that is curved as viewed in a cross section, and a side wall that is provided in a standing manner so as to surround a circumference of the bottom surface;
    a light guide plate that is housed in the frame, that is curved along the bottom surface as viewed in the cross section, and that includes an emission surface for emitting light; and
    a plurality of optical sheets that are arranged along the emission surface of the light guide plate and that overlap with one another as viewed in a plan view, wherein
    an end portion of at least one of the plurality of optical sheets is fixed to an upper end surface of the side wall of the frame via a fixing member, wherein the one of the optical sheets is an optical sheet located farthest from the emission surface, and
    wherein end portions of the optical sheets other than the optical sheet located farthest are arranged in a notch portion provided on an inner peripheral side of the side wall.

2. The planar illumination apparatus according to claim 1, wherein
    the one of the optical sheets is an optical sheet located farthest from the emission surface,
    the optical sheets other than the optical sheet located farthest include convex portions that extend in a horizontal direction with respect to the optical sheets, at different positions on end portions, and
    the convex portions are fixed, via fixing members, to upper surfaces of notch portions that are provided at positions corresponding to the convex portions on an upper end surface side of the side wall.

3. The planar illumination apparatus according to claim 1, further comprising:
    a light shielding sheet that defines an effective region of the emission surface, wherein
    the light shielding sheet is arranged so as to cover at least the end portion fixed to the frame.

4. The planar illumination apparatus according to claim 1, wherein the fixing member is at least one of a double-sided tape and an adhesive agent.

5. A planar illumination apparatus comprising:
    a frame including a bottom surface that is curved as viewed in a cross section, and a side wall that is provided in a standing manner so as to surround a circumference of the bottom surface;
    a light guide plate that is housed in the frame, that is curved along the bottom surface as viewed in the cross section, and that includes an emission surface for emitting light; and
    a plurality of optical sheets that are arranged along the emission surface of the light guide plate and that overlap with one another as viewed in a plan view, wherein
    an end portion of at least one of the plurality of optical sheets is fixed to an upper end surface of the side wall of the frame via a fixing member, wherein
    the frame is configured such that a thickness between an upper end surface and a lower end surface of the side wall is thinner than a thickness of the light guide plate, and
    the one of the optical sheets is an optical sheet located closest to the emission surface.

6. The planar illumination apparatus according to claim 5, wherein end portions of the optical sheets other than the optical sheet located closest are fixed to the frame by fixing members via an end portion of the optical sheet located closest.

7. The planar illumination apparatus according to claim 6, wherein the fixing members are arranged at positions that do not overlap with one another as viewed in a plan view.

8. The planar illumination apparatus according to claim 5, wherein the optical sheets other than the optical sheet located closest have convex portions that extend in a horizontal direction with respect to the optical sheets, at different positions on end portions, and the convex portions are fixed to the optical sheet located closest by fixing members.

9. The planar illumination apparatus according to claim 5, further comprising:

a light shielding sheet that defines an effective region of the emission surface, wherein the light shielding sheet is arranged so as to cover at least the end portion fixed to the frame.

10. The planar illumination apparatus according to claim 5, wherein the fixing member is at least one of a double-sided tape and an adhesive agent.

11. A planar illumination apparatus comprising:

a frame including a bottom surface that is curved as viewed in a cross section, and a side wall that is provided in a standing manner so as to surround a circumference of the bottom surface;

a light guide plate that is housed in the frame, that is curved along the bottom surface as viewed in the cross section, and that includes an emission surface for emitting light; and a plurality of optical sheets that are arranged along the emission surface of the light guide plate and that overlap with one another as viewed in a plan view, wherein an end portion of at least one of the plurality of optical sheets is fixed to an upper end surface of the side wall of the frame via a fixing member, wherein the frame includes a tapered surface that is inclined in a direction in which the upper end surface of the side wall is separated from the emission surface of the light guide plate, the one of the optical sheets is an optical sheet located closest to the emission surface, and an end portion of the optical sheet is fixed to the tapered surface.

12. The planar illumination apparatus according to claim 11, wherein end portions of the optical sheets other than the optical sheet located closest are fixed to the frame by fixing members via the end portion of the optical sheet located closest.

13. The planar illumination apparatus according to claim 11, further comprising:

a light shielding sheet that defines an effective region of the emission surface, wherein the light shielding sheet is arranged so as to cover at least the end portion fixed to the frame.

14. The planar illumination apparatus according to claim 11, wherein the fixing member is at least one of a double-sided tape and an adhesive agent.

15. A planar illumination apparatus comprising:

a frame including a bottom surface that is curved as viewed in a cross section, and a side wall that is provided in a standing manner so as to surround a circumference of the bottom surface;

a light guide plate that is housed in the frame, that is curved along the bottom surface as viewed in the cross section, and that includes an emission surface for emitting light;

a plurality of optical sheets that are arranged along the emission surface of the light guide plate and that overlap with one another as viewed in a plan view, wherein an end portion of at least one of the plurality of optical sheets is fixed to an upper end surface of the side wall of the frame via a fixing member; and a light shielding sheet that defines an effective region of the emission surface, wherein the light shielding sheet is arranged so as to cover at least the end portion fixed to the frame, and wherein end portions of the optical sheets other than the optical sheet located farthest are arranged in a notch portion provided on an inner peripheral side of the side wall.

16. The planar illumination apparatus according to claim 15, wherein the fixing member is at least one of a double-sided tape and an adhesive agent.

* * * * *